(12) United States Patent
Fair et al.

(10) Patent No.: US 10,177,867 B2
(45) Date of Patent: *Jan. 8, 2019

(54) MAINTAINING CLOCK SYNCHRONIZATION IN A DIGITAL NETWORK WITHOUT CONTINUOUS TRANSMISSION

(71) Applicant: Audio-Technica U.S., Inc., Stow, OH (US)

(72) Inventors: Brian K. Fair, Boyds, MD (US); Robert T. Green, Streetsboro, OH (US); Jacquelynn A. Green, Streetsboro, OH (US)

(73) Assignee: Audio-Technica U.S., Inc., Stow, OH (US)

( * ) Notice: Subject to any disclaimer, the term of this patent is extended or adjusted under 35 U.S.C. 154(b) by 35 days.

This patent is subject to a terminal disclaimer.

(21) Appl. No.: 15/162,466

(22) Filed: May 23, 2016

(65) Prior Publication Data

US 2016/0269136 A1 Sep. 15, 2016

Related U.S. Application Data

(63) Continuation of application No. 14/915,609, filed as application No. PCT/US2014/055200 on Sep. 11, 2014.
(Continued)

(51) Int. Cl.
*H04Q 11/00* (2006.01)
*H04J 3/06* (2006.01)
(Continued)

(52) U.S. Cl.
CPC .............. *H04J 3/0658* (2013.01); *G06F 1/12* (2013.01); *H04B 7/2656* (2013.01);
(Continued)

(58) Field of Classification Search
CPC ..................................................... H04J 3/0658
See application file for complete search history.

(56) References Cited

U.S. PATENT DOCUMENTS

| 566,636 | A | 8/1896 | Waldron |
| 5,872,518 | A | 2/1999 | Kushita |

(Continued)

FOREIGN PATENT DOCUMENTS

| EP | 2549307 A1 | 1/2013 |
| JP | H04326826 A | 11/1992 |

(Continued)

OTHER PUBLICATIONS

International Search Report and Written Opinion dated Dec. 4, 2014 for International Application No. PCT/US2014/055200 from International Searching Authority, pp. 1-14, United States.
(Continued)

*Primary Examiner* — Gerald A Smarth
(74) *Attorney, Agent, or Firm* — Sherman IP LLP; Kenneth L. Sherman; Hemavathy Perumal

(57) ABSTRACT

Embodiments of the present invention provide a mobile device comprising a slave clock, a receiver unit for receiving one or more frames from a remote device including a master system clock, a transmitter unit for transmitting one or more frames to the remote device, and a clock error correction unit. The clock error correction unit is configured to maintain clock synchronization between the slave clock and the master system clock, and maintain frame alignment for frames transmitted from the transmitter unit.

10 Claims, 10 Drawing Sheets

Related U.S. Application Data

(60) Provisional application No. 61/876,693, filed on Sep. 11, 2013.

(51) Int. Cl.

| | | |
|---|---|---|
| *G06F 1/12* | (2006.01) | |
| *H04B 7/26* | (2006.01) | |
| *H04L 7/00* | (2006.01) | |
| *H04L 7/04* | (2006.01) | |
| *H04W 56/00* | (2009.01) | |
| *H04R 27/00* | (2006.01) | |

(52) U.S. Cl.
CPC .......... *H04J 3/0682* (2013.01); *H04L 7/0037* (2013.01); *H04L 7/042* (2013.01); *H04W 56/001* (2013.01); *H04R 27/00* (2013.01); *H04R 2227/003* (2013.01); *H04R 2420/07* (2013.01)

(56) References Cited

U.S. PATENT DOCUMENTS

| | | | |
|---|---|---|---|
| 6,456,614 B1 | 9/2002 | Guan et al. | |
| 6,577,872 B1* | 6/2003 | Lundh | H04B 7/269 370/350 |
| 7,535,931 B1* | 5/2009 | Zampetti | H03L 7/08 370/252 |
| 8,571,158 B2 | 10/2013 | Chen et al. | |
| 8,787,433 B2 | 7/2014 | Chaudhuri | |
| 9,219,540 B2 | 12/2015 | Vu | |
| 9,312,953 B2 | 4/2016 | Soto | |
| 9,420,599 B2 | 8/2016 | Ko | |
| 2002/0114354 A1* | 8/2002 | Sinha | H04J 3/0658 370/503 |
| 2005/0164743 A1* | 7/2005 | Wesby | H04J 3/0664 455/561 |
| 2009/0054075 A1* | 2/2009 | Boejer | G01S 19/09 455/456.1 |
| 2009/0167653 A1* | 7/2009 | Lin | F16M 11/10 345/87 |
| 2011/0158364 A1 | 6/2011 | Fullam | |
| 2015/0043688 A1* | 2/2015 | Anastasov | H04L 7/0008 375/354 |
| 2016/0211935 A1 | 7/2016 | Fair et al. | |

FOREIGN PATENT DOCUMENTS

| | | |
|---|---|---|
| JP | H11122253 A | 4/1999 |
| JP | 2007235217 A | 9/2007 |
| WO | 0213421 A2 | 2/2002 |

OTHER PUBLICATIONS

International Preliminary Report on Patentability dated Sep. 30, 2015 for International Application No. PCT/US2014/055200 from International Preliminary Examining Authority, pp. 1-23, United States.

Extended European Search Report dated Apr. 7, 2017 for European Application No. 14843705.6 from European Patent Office Action, pp. 1-8, Munich, Germany.

U.S. Non-Final Office Action for U.S. Appl. No. 14/915,609 dated Jun. 30, 2017.

European Examination Report dated Dec. 14, 2017 for European Application No. 14843705.6 from European Patent Office Action, pp. 1-6, Munich, Germany.

U.S. Non-Final Office Action for U.S. Appl. No. 14/915,609, dated Jan. 17, 2018.

Chinese Office Action dated Apr. 28, 2018 for Chinese Patent Application No. 201480050137.6 for Chinese Patent Office, pp. 1-13, Beijing, China (English translation included pp. 1-8).

European Examination Report dated May 18, 2018 for European Application No. 14843705.6 from European Patent Office, pp. 1-5, Munich, Germany.

U.S. Final Office Action for U.S. Appl. No. 14/915,609 dated Aug. 9, 2018.

European Examination Report dated Oct. 26, 2018 for European Application No. 14843705.6 from European Patent Office, pp. 1-4, Rijswijk, Netherlands.

U.S. Notice of Allowance for U.S. Appl. No. 14/915,609 dated Nov. 21, 2018.

\* cited by examiner

MAINTAINING CLOCK SYNCHRONIZATION IN A DIGITAL NETWORK WITHOUT CONTINUOUS TRANSMISSION

BACKGROUND OF THE INVENTION

Field of the Invention

The present invention relates generally to maintaining clock synchronization in a digital network without continuous transmission of a signal across the network.

Description of Related Art

Electronic devices that are remote from one another in a network must be synchronized so that they may properly function together. For example, electronic audio devices within an audio system (e.g., a public address system including microphones, amplifiers and/or loudspeakers) must be synchronized to properly communicate and function together. A high speed clock signal may be shared between the audio devices to maintain synchronization between the audio devices. In some cases, however, sharing of a high speed clock signal between audio devices is impractical as the audio devices are not within close proximity to each other or because there is not a continuous signal being transmitted between the devices or for many other reasons.

BRIEF SUMMARY OF THE INVENTION

The preferred embodiments of the present invention provide communication networks including a mobile device and a remote device. The mobile device may comprise a slave clock, a receiver unit for receiving one or more frames from the remote device, a transmitter unit for transmitting one or more frames to the remote device and a clock error correction unit. The remote device may include a master system clock. The clock error correction unit is configured to maintain clock synchronization between the slave clock and the master system clock, and maintain frame alignment for frames transmitted from the transmitter unit to the remote device.

These and other features, aspects, and advantages of the present invention will become understood with reference to the following description, appended claims, and accompanying figures.

DETAILED DESCRIPTION OF THE INVENTION

The illustrated preferred embodiments of the present invention provide a communications network including a mobile device and a remote device. The mobile device may comprise a slave clock, a receiver unit for receiving one or more frames from the remote device, a transmitter unit for transmitting one or more frames to the remote device and a clock error correction unit. The remote device may include a master system clock. The clock error correction unit is configured to maintain clock synchronization between the slave clock and the master system clock, and maintain frame alignment for frames transmitted from the transmitter unit to the remote device.

Figure 1:
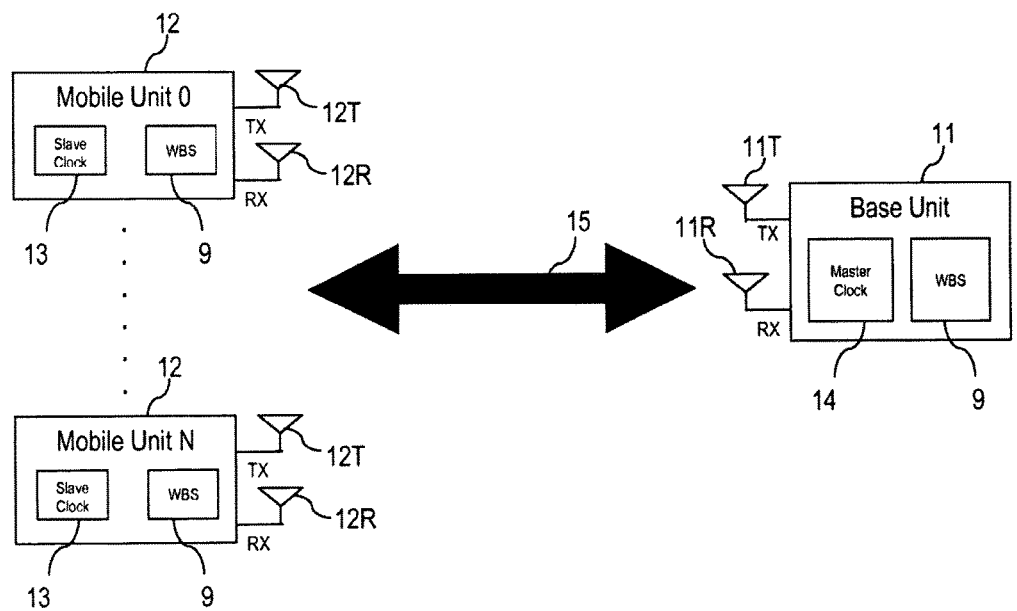
FIG. 1 is a block diagram of a digital wireless system, in accordance with a preferred embodiment of the invention.

FIG. 1 is a block diagram of a digital wireless system 10, in accordance with a preferred embodiment of the invention. The system 10 comprises a base unit 11 and one or more mobile units 12. In one embodiment, the base unit 11 may represent an electronic device for receiving and outputting data (e.g., audio data, video data, etc.). Examples of a base unit 11 include an audio receiver, an amplifier, a loud speaker, etc. Each mobile unit 12 may represent an electronic device for capturing and transmitting data (e.g., captured/recorded audio data, captured/recorded video data). The mobile unit 12 may further include a transducer unit to capture stimulus and reduce the stimulus to an electronically coded signal. Examples of a mobile unit 12 include a microphone, a video camera, etc.

In one preferred embodiment of a network of the invention, each of the base unit 11 and each mobile unit 12 may each include a wireless base station (WBS) 9 configured to wirelessly communicate/exchange information over a wireless communication link 15. For example, the base unit 11 and each mobile unit 12 may operate on one or more radio frequencies. Each mobile unit 12 includes a wireless transceiver 12T and a wireless receiver 12R, and the base unit 11 includes a wireless transceiver 11T and a wireless receiver 11R. Each wireless transceiver 12T of each mobile unit 12 is configured to wirelessly transmit radio frequency (RF) signals to the wireless receiver 11R of the base unit 11. Each wireless transceiver 12T of each mobile unit 12 is configured to wirelessly receive RF signals from the wireless transmitter 11T of the base unit 11.

As another example, the base unit 11 and each mobile unit 12 may wirelessly communicate/exchange information using infrared (I/R) waves or I/R signals.

The base unit 11 includes a system master clock 14. Each mobile unit 12 includes a slave clock 13. As described in detail later herein, each slave clock 13 may be synchronized with the system master clock 14 in the absence of a continuous transmission of a signal between the slave clock 13 and the system master clock 14.

Figure 2:
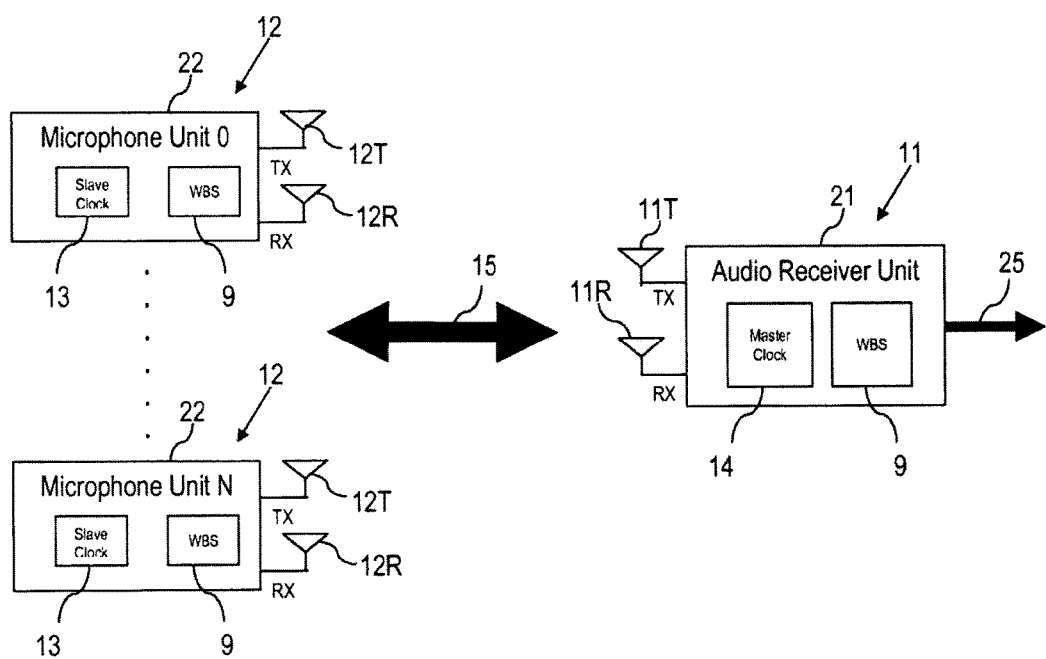
FIG. 2 is a block diagram of a digital wireless microphone system, in accordance with a preferred embodiment of the invention.

FIG. 2 is a block diagram of a digital wireless microphone system 20, in accordance with a preferred embodiment of a network developed in accordance with the invention. The network system 20 is an example digital wireless system 10 comprising an audio receiver unit 21 and one or more microphone units 22. The audio receiver unit 21 is an example of a base unit 11. Each microphone unit 22 is an example of a mobile unit 12. The audio receiver unit 21 and the microphone units 22 wirelessly communicate/exchange information over a wireless communication link 15.

In one preferred embodiment of the invention, the audio receiver unit 21 may transmit audio data received from each microphone unit 22 (e.g., audio data captured/recorded by each microphone unit 22) over a cable connection link 25 to another system/device for processing or output, such as a public address system including amplifiers and/or loud speakers.

Figure 3:
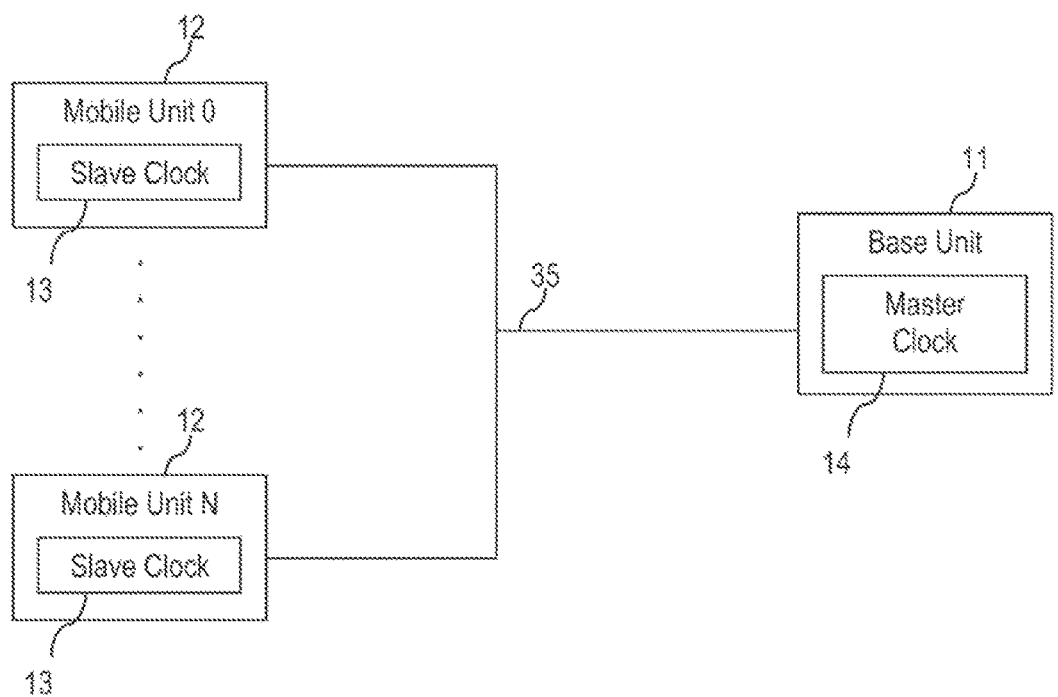
FIG. 3 is a block diagram of a digital wired system, in accordance with a preferred embodiment of the invention.

FIG. 3 is a block diagram of a digital wired system 30, in accordance with a preferred embodiment of the invention. The system 30 comprises a base unit 11 and one or more mobile units 12. In one embodiment, the base unit 11 and each mobile unit 12 communicate/exchange information via a wired communication link 35. As described in detail later herein, each slave clock 13 may be synchronized with the system master clock 14 in the absence of a continuous transmission of a signal between the slave clock 13 and the system master clock 14.

Figure 4:
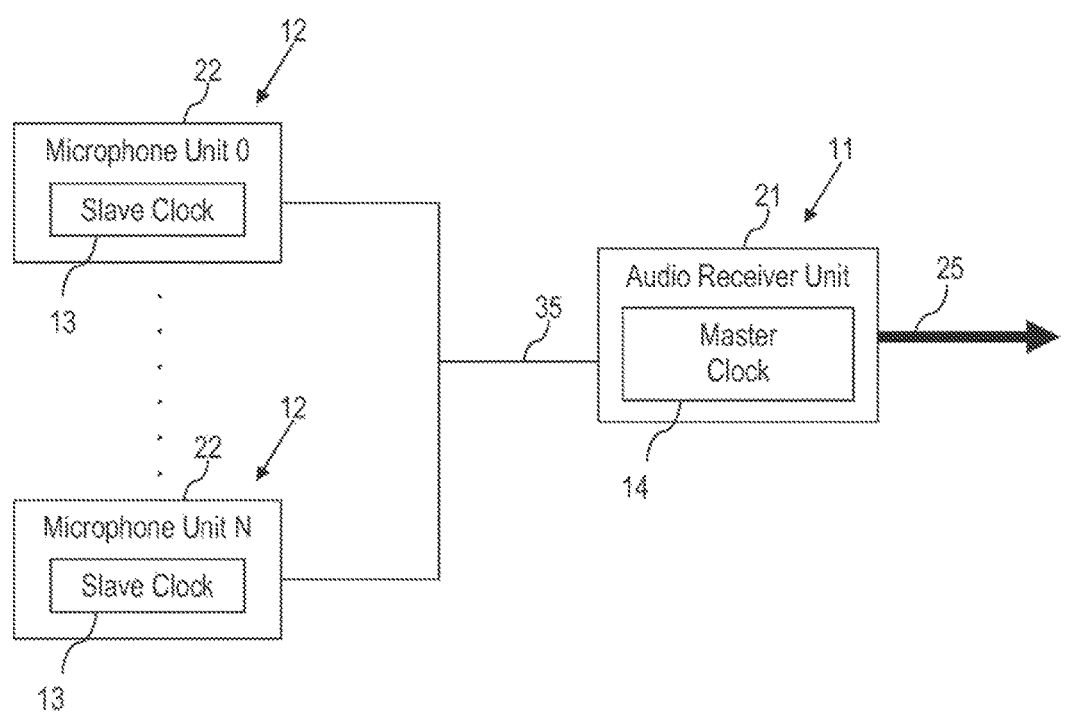
FIG. 4 is a block diagram of a digital wired microphone system, in accordance with a preferred embodiment of the invention.

FIG. 4 is a block diagram of a digital wired microphone system 40, in accordance with a preferred embodiment of the invention. The system 40 is an example digital wired system 10 comprising an audio receiver unit 21 and one or more microphone units 22. The system 40 comprises an audio receiver unit 21 and one or more microphone units 22. The audio receiver unit 21 and the microphone units 22 communicate/exchange information via a wired communication link 35.

Figure 5:
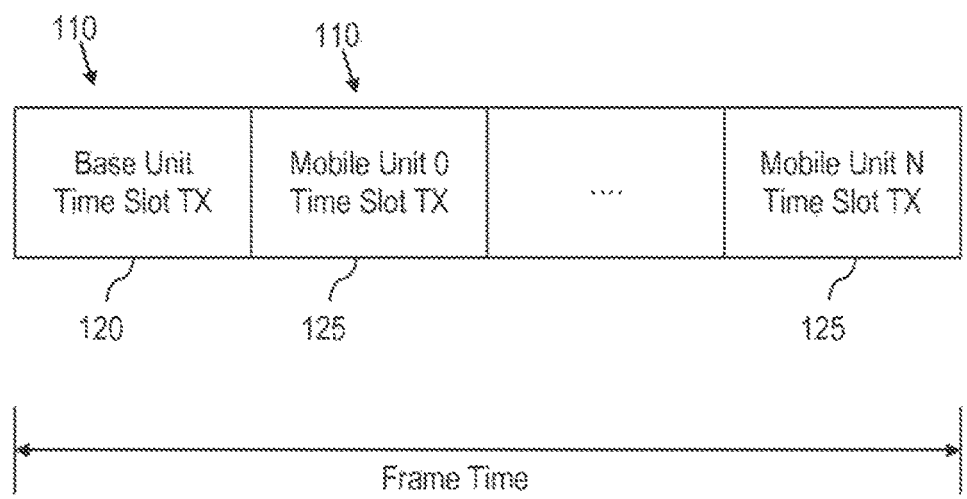
FIG. 5 illustrates an example frame structure, in accordance with a preferred embodiment of the present invention.

FIG. 5 illustrates an example frame structure 100, in accordance with a preferred embodiment of the present invention. As described in detail later herein, to maintain clock synchronization with a system master clock 14 of a base unit 11, a mobile unit 12 computes measurements and adjusts a slave clock 13 of the mobile unit 12 based on the measurements computed. In order for the mobile unit 12 to compute measurements necessary to maintain lock (i.e., maintain clock synchronization with the system master clock 14), a frame structure 100 from the base unit 11 needs to be known ahead of time, and be regular and repeatable. If the base unit 11 sends information in an ad-hoc manner instead (i.e., outside of a frame structure), the mobile unit 12 will not be able to compute the measurements necessary to maintain lock.

In one embodiment, structured, regular, repeatable frame structures 100 are utilized to maintain clock synchronization between a system master clock 14 and each slave clock 13 in a digital network without a continuous signal transmission between the slave clock 13 and the system master clock 14.

Embodiments of the present invention may be applicable to different types of known frame structures. In one preferred embodiment of the invention, the frame structure 100 is a Time Division Multiple Access (TDMA) frame structure which may be divided into multiple time slots 110. The base unit 11 and the mobile units 12 may transmit frames 1 (shown in FIG. 10), over the same channel which may be a radio frequency or via the same cable connection link 35, at different time slots. Each unit 11, 12 has at least one designated time slot 110.

Specifically, the frame structure 100 includes at least one base unit time slot 120, wherein the base unit time slot 120 represents a time slot 110 designated for the base unit 11. The frame structure 100 may further include one or more mobile unit time slots 125, wherein each mobile unit time slot 125 represents a time slot 110 designated for a particular mobile unit 12. When the base unit 11 transmits a frame 1 during a base unit time slot 120, the mobile units 12 attempt to receive the transmitted frame 1 during the base unit time slot 120. Similarly, when a mobile unit 12 transmits a frame 1 during a corresponding mobile unit time slot 125, the base unit 11 attempts to receive the transmitted frame 1 during the mobile unit time slot 125.

In one preferred embodiment of the invention, each slave clock 13 of each mobile unit 12 is synchronized upon receiving a frame 1 transmitted by the base unit 11 during a base unit time slot 120. Upon receiving the transmitted frame 1, frames 1 from each mobile unit 12 are aligned in accordance with the frame structure 100.

In another preferred embodiment of the invention, the frame structure 100 is another type of frame structure that is regular and repeatable, such as a code division multiple access (CDMA) burst frame structure.

In one preferred embodiment of the invention, the base unit 11 and the mobile units 12 transmit frames 1 at any one point in time over multiple radio frequencies (e.g., the wireless transceivers 11T, 12T operate on a different radio frequency than the wireless receivers 11R, 12R).

In another preferred embodiment of the invention, different wired topologies may be utilized. For example, for each mobile unit 12, two wired connection links 25 may be used to interconnect the mobile unit 12 to the base unit 11.

Figure 6:
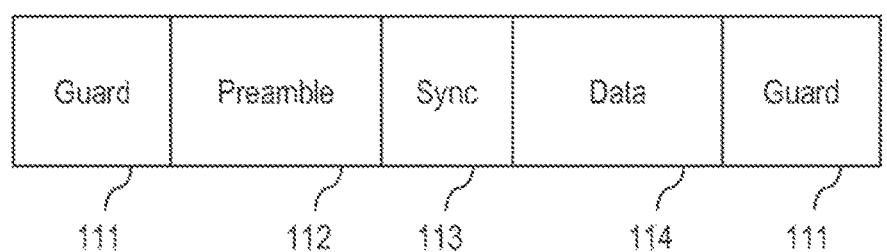
FIG. 6 illustrates an example slot structure for a time slot, in accordance with a preferred embodiment of the invention.

FIG. 6 illustrates an example slot structure for a time slot 110, in accordance with a preferred embodiment of the invention. As stated above, each unit 11, 12 transmits a frame 1 during a designated time slot 110. In one embodiment, a frame 1 transmitted by a unit 11 includes multiple fields representing different types of information, such as a guard band field 111, a preamble field 112, a sync field 113, and a data field 114.

Figure 7:
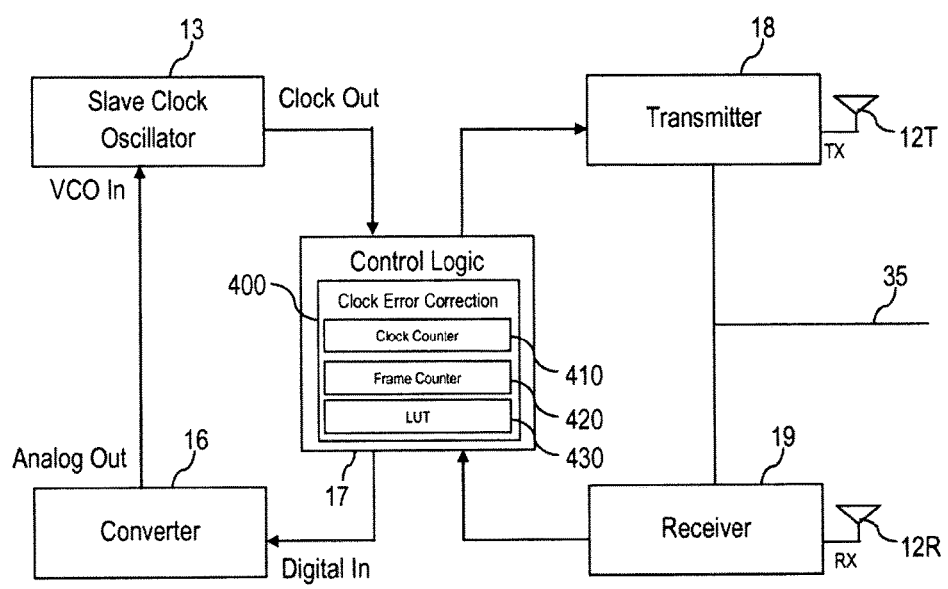
FIG. 7 is a block diagram of an example mobile unit, in accordance with a preferred embodiment of the invention.

FIG. 7 is a block diagram of an example mobile unit 12, in accordance with a preferred embodiment of the invention. In one embodiment, a slave clock 13 of a mobile unit 12 is a slave clock oscillator. The mobile unit 12 further comprises a converter 16 (e.g., a digital-to-analog converter), a control logic module 17, a transmitter 18, and a receiver 19. The transmitter 18 is configured to transmit frames 1 to a base unit 11 (e.g., via a wired connection link 35 or wirelessly via a wireless transceiver 12T over a wireless connection link 15). The receiver 19 is configured to receive frames 1 from a base unit 11 (e.g., via a wired connection link 35 or wirelessly via a wireless receiver 12R over a wireless connection link 15).

To determine frame timing, the mobile unit 12 monitors a frame structure 110 to locate a base unit time slot 120 included in the frame structure 110. The mobile unit 12 will not transmit frames 1 until it locates the base unit time slot 120 and its slave clock 13 is synchronized with the system master clock 14 of the base unit 11.

To maintain clock synchronization between the system master clock 14 and the slave clock 13, the control logic module 17 locally calculates multiple clock error correction parameters, and adjusts the slave clock 13 based on the clock error parameters calculated. The mobile unit 12 does not need to rely on calculations/measurements from remote entities, such as the base unit 11 or another mobile unit 12.

In one preferred embodiment of the invention, the slave clock 13 is adjusted to compensate for differences in frequency and/or phase between the system master clock 14 and the slave clock 13. Adjusting the slave clock 13 to compensate for differences in frequency and/or phase between the system master clock 14 and the slave clock 13 also maintains frame alignment of the frame structure 100. Without phase correction, frames 1 from the mobile unit 12 will not be aligned in accordance with the frame structure 100.

In this specification, let CFE denote a clock frequency error between two clock periods in parts per million (PPM) units. In general, a clock frequency error CFE is calculated in accordance with equation (1) as provided below:

$$CFE=((T_m-T_s)/T_s)*10^6 \qquad (1),$$

wherein $T_m$ represents clock period of the system master clock 14, and wherein $T_s$ represents clock period of the slave clock 13.

In one preferred embodiment of the invention, the control logic module 17 includes a clock error correction unit 400 for calculating the clock error correction parameters used in adjusting the slave clock 13. The clock error correction unit 400 locally maintains a clock counter 410 and a frame counter 420. The clock counter 410 maintains an integer value $Clk_{13}$_Cnt representing the number of clock cycles that has elapsed. The frame counter 420 maintains an integer value Frm_Cnt representing the number of frames that has transpired since a previous measurement computed/performed by the mobile unit 12.

In this specification, let MAX_CLK_CNT denote a threshold integer value representing a maximum number of clock cycles.

When the mobile unit 12 locates a first base unit time slot 120, the clock counter 410 and the frame counter 420 are reset. The clock counter 410 is incremented at every clock cycle. The frame counter 420 is incremented when the clock counter 410 equals MAX_CLK_CNT/2. In one embodiment, the frame counter gets reset after every measurement.

After a minimum number of frames 1 has transpired and a next base unit time slot 120 is located, the clock error correction unit 400 computes a measurement (i.e., performs a measurement pass). Specifically, the clock error correction unit 400 calculates a clock frequency error CFE in accordance with equation (2) as provided below:

$$CFE=(Clk\_Cnt*CONST_{PPM})/Frm\_Cnt \qquad (2),$$

wherein $CONST_{PPM}=(Clk\_Prd*10^6)/Frm\_Prd$, wherein Clk_Prd represents clock period of the slave clock 13, and wherein Frm_Prd represents frame period.

In one preferred embodiment of the invention, the clock frequency error calculated is a two's complement signed number. The sign of the clock frequency error determines whether the slave clock 13 is faster or slower than the system master clock 14. For example, the slave clock 13 is faster than the system master clock 14 if the clock frequency error value is positive. The slave clock 13 is slower than the system master clock 14 if the clock frequency error value is negative.

In one preferred embodiment of the invention, the calculation of clock frequency error comprises two parts. First, differences in frequency and/or phase between the system master clock 14 and the slave clock 13 are measured. Second, the slave clock 13 is adjusted based on the differences measured.

In this specification, let $\Delta_t$ represent a measured time difference between the system master clock 14 and the slave clock 13 after a minimum number of frames 1 has transpired. The time difference $\Delta_t$ is measured in clock cycles. The minimum number of frames 1 is selected to be long enough for an accurate measurement pass, but short enough such that a time difference $\Delta_t$ measured satisfies equation (3) as provided below:

$$\Delta_t < T_F/2 \qquad (3),$$

wherein $T_F$ represents frame period, and wherein the granularity of the measurement is equal to $((Clk\_Prd)/(Frm\_Cnt*Frm\_Prd))*10^6$.

The clock correction error parameters are calculated in terms of clock cycles instead of PPM to reduce/minimize the amount of processing power consumed during calculations. The clock error correction unit 400 further includes a lookup table (LUT) 430 maintaining multiple digital-to-analog (D/A) values corresponding to different correction parameters.

Figure 8:
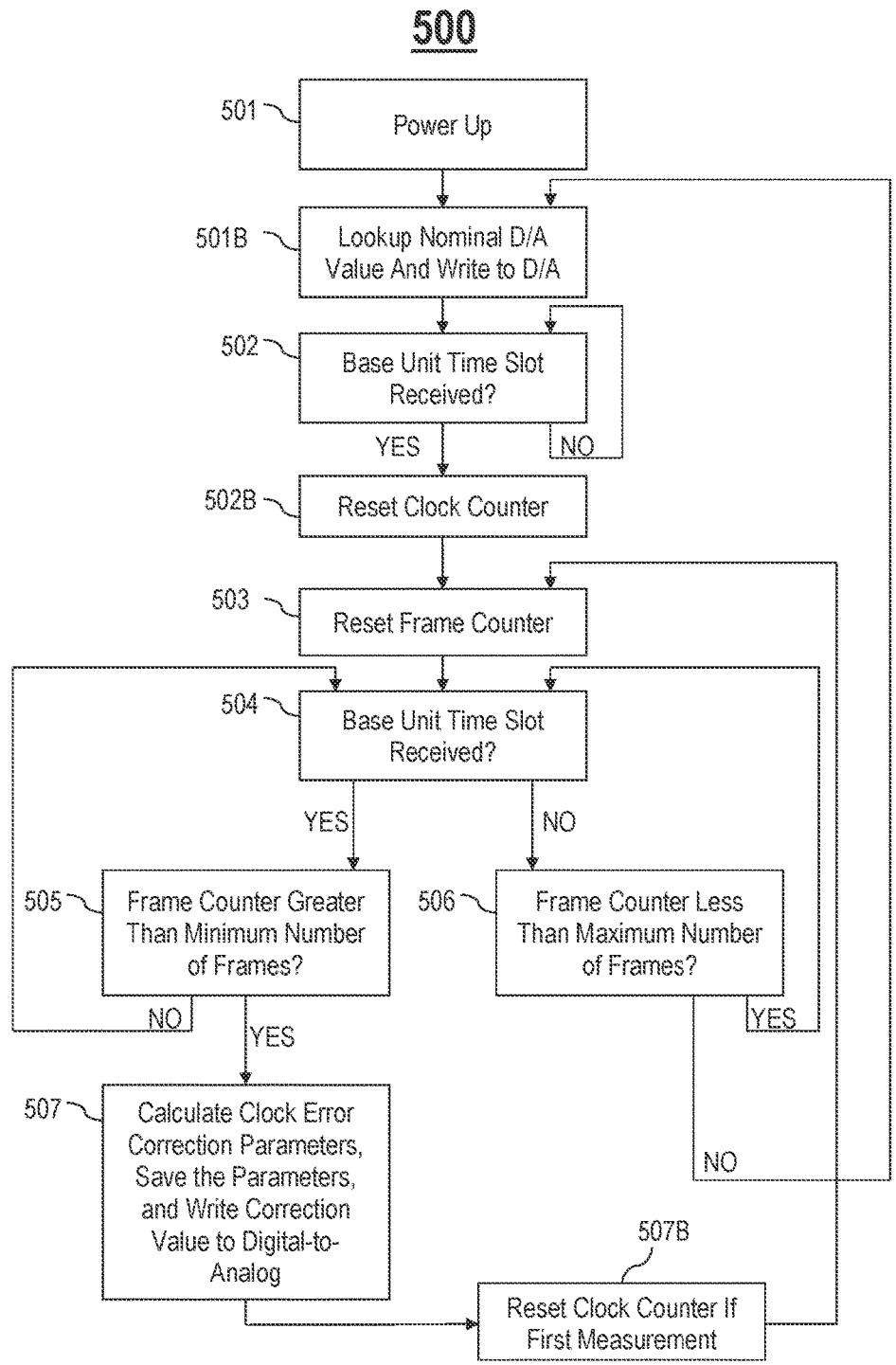
FIG. 8 is a flowchart of an example process for determining when clock error correction parameters are calculated, in accordance with a preferred embodiment of the present invention.

FIG. 8 is a flowchart of an example process 500 for determining when clock error correction parameters are calculated, in accordance with a preferred embodiment of the present invention. In process block 501, a mobile unit 12 is powered up/powered on. In process block 501B, the mobile unit 12 lookups a nominal D/A value in the lookup table 430 and writes to D/A. In process block 502, the mobile unit 12 determines whether a frame 1 from a base unit 11 is received during a base unit time slot 120 by searching for the base unit time slot 120. If a frame 1 from the base unit 11 is received, proceed to process block 502B. If a frame 1 from the base unit 11 is not received, return to process block 502.

In process block 502B, a clock counter 410 maintained by the mobile unit 12 is reset. In process block 503, a frame counter 420 maintained by the mobile unit 12 is reset. The clock counter 410 is incremented every clock cycle, and the frame counter 420 is incremented when the clock counter 410 equals MAX_CLK_CNT/2.

In process block 504, the mobile unit 12 determines whether another frame 1 from the base unit 11 is received during another base unit time slot 120 by searching for another base unit time slot 120. If another frame 1 from the base unit 11 is received, proceed to process block 505. If another frame 1 from the base unit 11 is not received, proceed to process block 506.

In process block 505, the mobile unit 12 checks whether a minimum number of frames 1 has transpired by determining whether the frame counter 420 is greater than the minimum number of frames 1. If the frame counter 420 is greater than the minimum number of frames 1, proceed to process block 507. If the frame counter 420 is not greater than the minimum number of frames 1, return to process block 504.

In process block 506, the mobile unit 12 checks whether a maximum number of frames 1 has transpired by determining whether the frame counter 420 is less than the maximum number of frames 1. If the frame counter 420 is less than the maximum number of frames, return to process block 504. If the frame counter 420 is not less than the maximum number of frames, return to process block 501B as the process has failed.

In process block 507, calculate multiple clock error correction parameters, save the parameters calculated, and write a clock error correction value to a converter 16 of the mobile unit 12, wherein a slave clock 13 of the mobile unit 12 is adjusted based on the clock error correction value calculated. In process block 507B, the clock counter 410 maintained by the mobile unit 12 is reset only if first measurement. After process block 507B, the process returns to process block 503.

Figure 9:
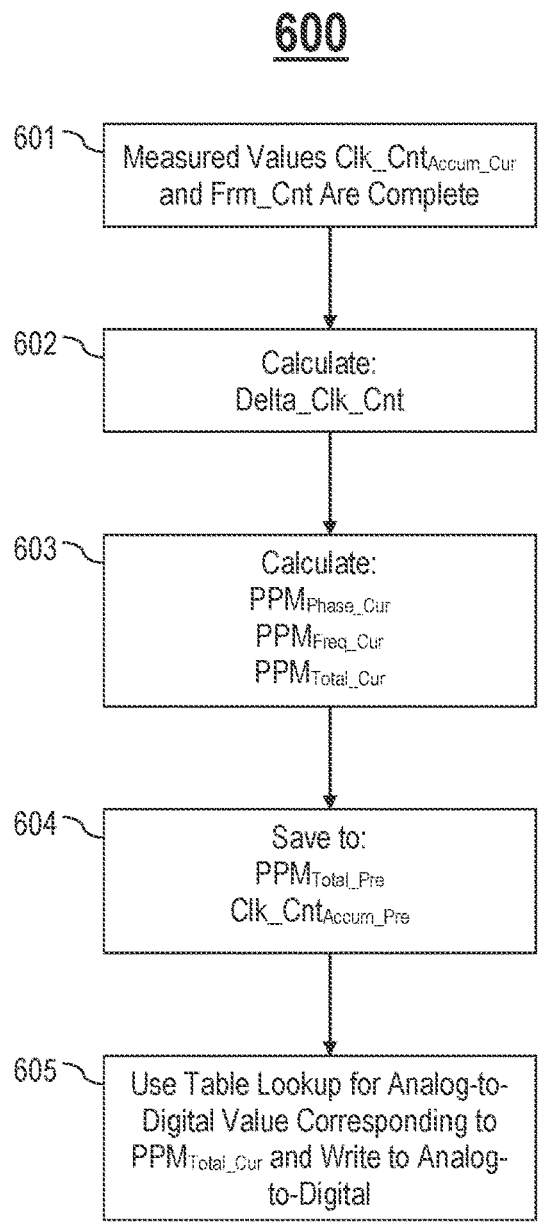
FIG. 9 is a flowchart of an example process for calculating clock error correction parameters, in accordance with a preferred embodiment of the present invention.

FIG. 9 is a flowchart of an example process 600 for calculating clock error correction parameters, in accordance with a preferred embodiment of the present invention. In process block 601, determine whether measured values for current accumulated clock count value $Clk\_Cnt_{Accum\_Cur}$ and Frm_Cnt in the clock counter 410 and the frame counter 420, respectively, are complete. In process block 602, calculate Delta_Clk_Cnt in accordance with equation (4) as provided below:

$$Delta\_Clk\_Cnt=Clk\_Cnt_{Accum\_Cur}-Clk\_Cnt_{Accum\_Pre} \quad (4),$$

wherein $Clk\_Cnt_{Accum\_Pre}$ denotes a previous accumulated clock count value.

In process block 603, calculate a current phase correction parameter $PPM_{phase\_Cur}$, a current frequency correction parameter $PPM_{Freq\_Cur}$, and a current total correction parameter $PPM_{Total\_Cur}$ in accordance with equations (5), (6) and (7), respectively, as provided below:

$$PPM_{Phase\_Cur}=-Clk\_Cnt_{Accum\_Cur}*CONST_{PPM}*CONST_{Phase\_Loop}/CONST_{Frm\_Cnt} \quad (5),$$

$$PPM_{Freq\_Cur}=-((Delta\_Clk\_Cnt*CONST_{PPM})Frm\_Cnt)+PPM_{Total\_Pre} \quad (6),$$

and $$PPM_{Total\_Cur}=PPM_{Phase\_Cur}+PPM_{Freq\_Cur} \quad (7),$$

wherein $CONST_{PPM}=(Clk\_Prd*10^6)/Frm\_Prd$, wherein $CONST_{Phase\_Loop}$ represents a phase loop constant that is less than 1, and wherein $CONST_{Frm\_Cnt}$ represents an estimated number of frames between calculations. If first measurement, $PPM_{Phase\_Cur}$ is set to 0 instead.

In process block 604, update a previous total correction parameter $PPM_{Total\_Pre}$ and a previous accumulated clock count value $Clk\_Cnt_{Accum\_Pre}$ in accordance with equations (8) and (9), respectively, as provided below:

$$PPM_{Total\_Pre}=PPM_{Total\_Cur} \quad (8),$$

and $$Clk\_Cnt_{Accum\_Pre}=Clk\_Cnt_{Accum\_Cur} \quad (9).$$

If first measurement, $Clk\_Cnt_{Accum\_Pre}$ is set to 0 instead.

In process block 605, lookup an D/A value corresponding to the current total correction parameter $PPM_{Total\_Cur}$, and update the slave clock 13 by writing the D/A value to the converter 16.

In one preferred embodiment of the present invention, the current frequency correction parameter $PPM_{Freq\_Cur}$ is derived in accordance with equations (10)-(12), as provided below:

$$Delta\_Clk\_Cnt_{Phase}=PPM_{Phase\_Pre}*Frm\_Cnt/CONST_{PPM} \quad (10),$$

$$Delta\_Clk\_Cnt_{Freq}=Delta\_Clk\_Cnt-Delta\_Clk\_Cnt_{Phase} \quad (11),$$

and $$PPM_{Freq\_Cur}=-Delta\_Clk\_Cnt_{Freq}*CONST_{PPM}/Frm\_Cnt+PPM_{Freq\_Pre} \quad (12),$$

wherein $PPM_{Phase\_Pre}$ denotes a previous phase correction parameter, and wherein $PPM_{Freq\_Pre}$ denotes a previous frequency correction parameter.

In one preferred embodiment of the invention, the current frequency correction parameter $PPM_{Freq\_Cur}$ may be substituted in accordance with equation (13), as provided below:

$$PPM_{Freq\_Cur}=-Delta\_Clk\_Cnt*CONST_{PPM}/Frm\_Cnt+PPM_{Phase\_Pre}+PPM_{Freq\_Pre} \quad (13).$$

In one preferred embodiment of the present invention, the current frequency correction parameter $PPM_{Freq\_Cur}$ may further be substituted in accordance with equation (14), as provided below:

$$PPM_{Freq\_Cur}=-Delta\_Clk\_Cnt*CONST_{PPM}/Frm\_Cnt+PPM_{Total\_Pre} \quad (14).$$

Figure 10:
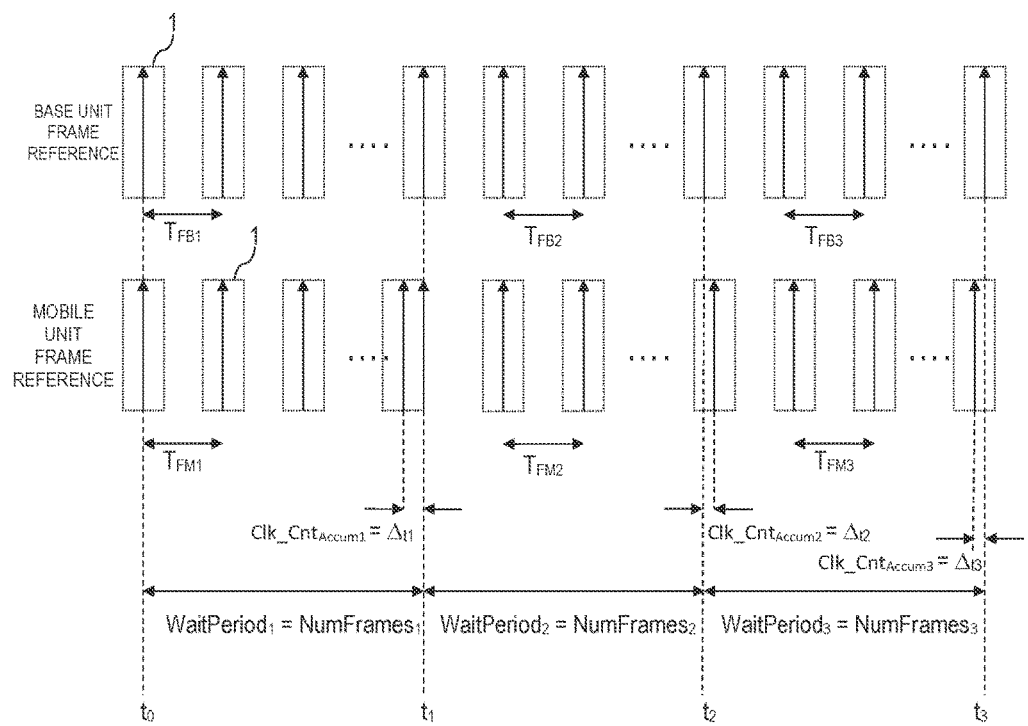
FIG. 10 is an example timing diagram illustrating clock synchronization between a system master clock of a base unit and a slave clock of a mobile unit, in accordance with a preferred embodiment of the invention.

FIG. 10 is an example timing diagram 300 illustrating clock synchronization between a system master clock 14 of a base unit 11 and a slave clock 13 of a mobile unit 12, in accordance with a preferred embodiment of the invention. As shown in FIG. 10, frames 1 from the mobile unit 12 drift over time and fall out of alignment. To prevent further drifting, adjustments to the slave clock 13 must factor in differences in frequency between the system master clock 14 and the slave clock 13. Further, to pull the frames back into alignment, adjustments to the slave clock 13 must also account for differences in phase between the system master clock 14 and the slave clock 13. To compensate for differences in phase, the mobile unit 12 pulls the slave clock 13 clock by a different amount than is needed to correct differences in frequency. During each measurement pass (e.g., a first measurement at time $t_1$, a second measurement at time $t_0$, a third measurement at time $t_3$), the mobile unit 12 determines how much of a time difference $\Delta_t$ (e.g., a first time difference $\Delta_{t1}$ between the base unit 11 and the mobile unit 12 measured in units of number of mobile unit clock cycles $Clk\_Cnt_{Accum1}$, a second time difference $\Delta_{t2}$ between the base unit 11 and the mobile unit 12 measured in units of number of mobile unit clock cycles $Clk\_Cnt_{Accum2}$, a third time difference $\Delta_{t3}$ between the base unit 11 and the mobile unit 12 measured in units of number of mobile unit clock cycles $Clk\_Cnt_{Accum3}$) measured is attributable to frequency drift and adjustments made to the slave clock 13 during a previous measurement pass. The mobile unit 12 compensates for differences in frequency and/or phase between the system master clock 14 and the slave clock 13 by pulling the slave clock 13. The frame counter 420 and clock counter 410 maintained by the mobile unit 12 may not be adjusted to prevent slips in frames (e.g., slips in audio samples).

For example, upon powering up/on at start time to and receiving a frame 1 from the base unit 11 during a base unit time slot 120, the mobile unit 12 resets its counters 410, 420, and aligns its frames 1 in accordance with the frame structure 110. The mobile unit 12 begins a first calculation loop/cycle during which the mobile unit 12 waits during a first wait period $WaitPeriod_1$ between $t_1$-$t_0$ for a minimum number of frames 1 to transpire. Let $T_{FB1}$ and $T_{F1}$ denote a frame period of the base unit 11 and the mobile unit 12 in the first wait period $WaitPeriod_1$, respectively. As the frame counter 420 and the clock counter 410 are not reset during the first wait period $WaitPeriod_1$, the mobile unit frame reference drifts and falls out of alignment with the base unit frame reference. The first loop ends when the mobile unit 12 receives a frame 1 from the base unit 11 during a base unit time slot 120 after the minimum number of frames 1 has transpired. At the end of the first loop, the mobile unit 12 computes/performs a first measurement at time $t_1$ by calculating a first time difference $\Delta_{t1}$ and clock error correction parameters, and adjusting the slave clock 13 based on the clock error correction parameters calculated. The clock error correction parameters calculated at the first measurement pass factors in differences in frequency; clock error correction parameters calculated at the first measurement pass does not factor differences in phase between the system master clock 14 and the slave clock 13. The clock counter 410 is reset after the first measurement to align the mobile unit frame reference with the base unit frame reference. Let NumFrames$_1$ denote the number of frames 1 that has transpired during the first loop. WaitPeriod$_1$ is measured in units of the number of frames NumFrames$_1$ transpired.

In one embodiment, the frame counter 420 gets reset after every measurement.

The mobile unit 12 begins a second loop during which the mobile unit 12 waits during a second wait period WaitPeriod$_2$ between t$_2$-t$_1$ for a minimum number of frames 1 to transpire. Let T$_{FB2}$ and T$_{FM2}$ denote a frame period of the base unit 11 and the mobile unit 12 in the second wait period WaitPeriod$_2$, respectively. The mobile unit frame reference may drift and fall out of alignment with the base unit frame reference. The second loop ends when the mobile unit 12 receives a frame 1 from the base unit 11 during a base unit time slot 120 after the minimum number of frames 1 has transpired. At the end of the second loop, the mobile unit 12 computes/performs a second measurement at time t$_2$ by calculating a second time difference $\Delta_{t2}$ and clock error correction parameters, and adjusting the slave clock 13 based on the clock error correction parameters calculated. The clock error correction parameters calculated at the second measurement pass factors in differences in frequency and phase. The clock counter 410 is not adjusted. Let NumFrames$_2$ denote the number of frames 1 that has transpired during the second loop. WaitPeriod$_2$ is measured in units of the number of frames NumFrames$_2$ transpired.

The mobile unit 12 begins a third loop during which the mobile unit 12 waits during a third wait period WaitPeriod$_3$ between t$_3$-t$_2$ for a minimum number of frames 1 to transpire. Let T$_{FB3}$ and T$_{FM3}$ denote a frame period of the base unit 11 and the mobile unit 12 in the third wait period WaitPeriod$_3$, respectively. The mobile unit frame reference may drift and fall out of alignment with the base unit frame reference. The third loop ends when the mobile unit 12 receives a frame from the base unit 11 during a base unit time slot 120 after the minimum number of frames 1 has transpired. At the end of the third loop, the mobile unit 12 computes/performs a third measurement at time t$_3$ by calculating a third time difference $\Delta_{t3}$ and clock error correction parameters, and adjusting the slave clock 13 based on the clock error correction parameters calculated. The clock error correction parameters calculated at the second measurement pass factors in differences in frequency and phase. The clock counter 410 is not adjusted. Let NumFrames$_3$ denote the number of frames 1 that has transpired during the third loop. WaitPeriod$_3$ is measured in units of the number of frames NumFrames$_3$ transpired.

Subsequent time difference measurements (i.e., the second time difference Ate measured, the third time difference $\Delta_{t3}$ measured) factor differences in frequency and/or phase between the system master clock 14 and the slave clock 13.

During communication with the base unit 11, the mobile unit 11 continues as described above to pull its frames into alignment until a measured time difference $\Delta_t$ approaches zero. As the base unit 11 and the mobile unit 12 are in lock, and the mobile unit 12 computes/performs a measurement before frames 1 from the base unit 11 and the mobile unit 12 drift too far apart, the number of frames from the base unit 11 and the number of frames from the mobile unit 12 during each loop will be the same or substantially similar.

During each loop, not every frame 1 from the base unit 11 needs to be received by the mobile unit 12.

The method of maintaining clock synchronization and frame alignment as described herein are applicable to the digital systems/networks in FIGS. 1-4, as well as other systems.

In one example implementation, the method of maintaining clock synchronization and frame alignment as described herein may be utilized in audio applications to provide synchronous audio quality with low latency and slips throughout an end-to-end chain between a first communication device (e.g., a base unit with a system master clock) and a second communication device (e.g., a mobile unit with a slave clock).

In one preferred embodiment of the present invention, a phase difference between the system master clock 14 and the slave clock 13, on average, will be zero. In one embodiment, the phase of the system master clock 14 is not locked with the phase of the slave clock 13 at any point in time.

Figure 11:
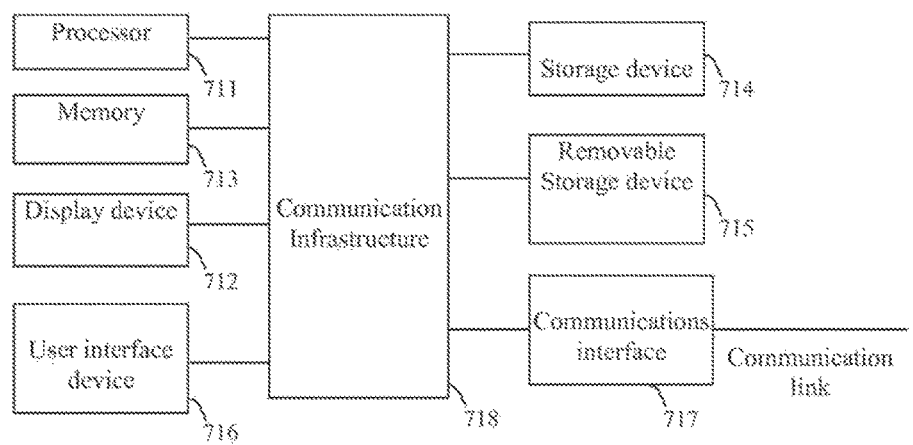
FIG. 11 is a high level block diagram showing a computer system useful for implementing a preferred embodiment of the present invention.

FIG. 11 is a high level block diagram showing a computer system 700 useful for implementing a preferred embodiment of the present invention. The computer system 700 includes one or more processors 711, and can further include an electronic display device 712 (for displaying graphics, text, and other data), a main memory 713 (e.g., random access memory (RAM)), storage device 714, removable storage device 715 (e.g., removable storage drive, removable memory module, a magnetic tape drive, optical disk drive, computer readable medium having stored therein computer software and/or data), user interface device 716 (e.g., keyboard, touch screen, keypad, pointing device), and a communication interface 717 (e.g., modem, a network interface (such as an Ethernet card), a communications port, or a PCMCIA slot and card). The communication interface 717 allows software and data to be transferred between the computer system and external devices. The system further includes a communications infrastructure 718 (e.g., a communications bus, cross-over bar, or network) to which the aforementioned devices/modules are connected as shown.

Information transferred via communications interface 717 may be in the form of signals such as electronic, electromagnetic, optical, or other signals capable of being received by communications interface 717, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Computer programs (i.e., computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Embodiments can also be implemented in different ways such as firmware, as logic circuits, integrated circuits, as field-programmable gate array (FPGA), application specific integrated circuit (ASIC), as hardware only, as software only, as hardware and software.

The present invention has been described in considerable detail with reference to certain preferred versions thereof; however, other versions are possible. The above description is made for the purpose of illustrating the general principles of the present invention and is not meant to limit the inventive concepts claimed herein. Further, particular features described above can be used in combination with other described features in each of the various possible combinations and permutations. Unless otherwise specifically defined herein, all terms should be given their broadest possible interpretation including meanings implied from the specification as well as meanings understood by those skilled in the art and/or as defined in dictionaries, treatises, etc. Therefore, the spirit and scope of the appended claims should not be limited to the description of the preferred versions contained herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A first communication device, comprising:
   a first system clock;
   a processor; and
   a non-transitory processor-readable memory device storing instructions that when executed by the processor causes the processor to perform operations including:
      exchanging one or more frames with a second communication device comprising a second system clock; and
      synchronizing the first system clock with the second system clock by:
         counting a number of frames that has transpired;
         determining whether a pre-determined number of frames has transpired based on the number of frames counted; and
         adjusting the first system clock in response to determining the pre-determined number of frames that has transpired;
   wherein the exchanging one or more frames with the second communication device comprises receiving at least one incoming frame from the second communication device, and transmitting at least one outgoing frame to the second communication device;
   wherein outgoing frames transmitted to the second communication device are aligned in accordance with a frame structure divided into a plurality of time slots, the plurality of time slots including at least one time slot designated for the second communication device, and the plurality of time slots further including one or more other time slots designated for one or more other communication devices including the first communication device; and
   wherein the operations further include aligning outgoing frames transmitted to the second communication device by determining a first difference in phase between the first system clock and the second system clock, determining a second difference in frequency between the first system clock and the second system clock, and adjusting the first system clock based on the first difference in phase determined and the second difference in frequency determined.

2. The first communication device of claim 1, wherein the first communication device and the second communication device exchange frames over a wired connection or a wireless connection.

3. The first communication device of claim 1, wherein the number of frames that has transpired is a wait period based in part on a number of clock cycles that have elapsed at the first communication device.

4. The first communication device of claim 3, wherein the synchronizing the first system clock with the second system clock further comprises:
   adjusting the first system clock upon satisfying each of the following conditions: the pre-determined number of frames that has transpired, and an incoming frame from the second communication device is received during a time slot designated for the second communication device.

5. A method, comprising:
   at a first communication device comprising a first system clock:
      exchanging one or more frames with a second communication device comprising a second system clock; and
      synchronizing the first system clock with the second system clock by:
         counting a number of frames that has transpired;
         determining whether a pre-determined number of frames has transpired based on the number of frames counted; and
         adjusting the first system clock in response to determining the predetermined number of frames that has transpired
   wherein the exchanging one or more frames with the second communication device comprises receiving at least one incoming frame from the second communication device, and transmitting at least one outgoing frame to the second communication device;
   wherein outgoing frames transmitted to the second communication device are aligned in accordance with a frame structure divided into a plurality of time slots, the plurality of time slots including at least one time slot designated for the second communication device, and the plurality of time slots further including one or more other time slots designated for one or more other communication devices including the first communication device; and
   wherein the method further comprises aligning outgoing frames transmitted to the second communication device by determining a first difference in phase between the first system clock and the second system clock, determining a second difference in frequency between the first system clock and the second system clock, and adjusting the first system clock based on the first difference in phase determined and the second difference in frequency determined.

6. The method of claim 5, wherein the first communication device and the second communication device exchange frames over a wired connection or a wireless connection.

7. The method of claim 5, wherein the number of frames that has transpired is a wait period based in part on a number of clock cycles that have elapsed at the first communication device.

8. The method of claim 7, wherein the synchronizing the first system clock with the second system clock further comprises:
adjusting the first system clock upon satisfying each of the following conditions: the pre-determined number of frames that has transpired, and an incoming frame from the second communication device is received during a time slot designated for the second communication device.

9. A non-transitory computer-readable medium storing instructions that, when executed by at least one processor of a machine, cause the machine to perform operations comprising:
at a first communication device comprising a first system clock:
exchanging one or more frames with a second communication device comprising a second system clock; and
synchronizing the first system clock with the second system clock by:
counting a number of frames that has transpired;
determining whether a pre-determined number of frames has transpired based on the number of frames counted; and
adjusting the first system clock in response to determining the predetermined number of frames that has transpired;

wherein the exchanging one or more frames with the second communication device comprises receiving at least one incoming frame from the second communication device, and transmitting at least one outgoing frame to the second communication device:
wherein outgoing frames transmitted to the second communication device are aligned in accordance with a frame structure divided into a plurality of time slots, the plurality of time slots including at least one time slot designated for the second communication device, and the plurality of time slots further including one or more other time slots designated for one or more other communication devices including the first communication device; and
wherein the operations further comprise aligning outgoing frames transmitted to the second communication device by determining a first difference in phase between the first system clock and the second system clock, determining a second difference in frequency between the first system clock and the second system clock, and adjusting the first system clock based on the first difference in phase determined and the second difference in frequency determined.

10. The non-transitory computer-readable medium of claim 9, wherein:
the number of frames that has transpired is a wait period based in part on a number of clock cycles that have elapsed at the first communication device; and
the synchronizing the first system clock with the second system clock further comprises:
adjusting the first system clock upon satisfying each of the following conditions:
the pre-determined number of frames that has transpired, and an incoming frame from the second communication device is received during a time slot designated for the second communication device.

* * * * *